(No Model.)

J. E. MATHEWSON.
APPARATUS FOR SEPARATING DUST FROM AIR.

No. 588,457. Patented Aug. 17, 1897.

Witnesses. Inventor.

Jeremiah Eugene Mathewson
by
Francis T. Chambers
his Attorney.

UNITED STATES PATENT OFFICE.

JEREMIAH E. MATHEWSON, OF SHEFFIELD, ENGLAND, ASSIGNOR TO BENJAMIN C. TILGHMAN AND RICHARD A. TILGHMAN, OF PHILADELPHIA, PENNSYLVANIA.

APPARATUS FOR SEPARATING DUST FROM AIR.

SPECIFICATION forming part of Letters Patent No. 588,457, dated August 17, 1897.

Application filed December 14, 1896. Serial No. 615,661. (No model.)

*To all whom it may concern:*

Be it known that I, JEREMIAH EUGENE MATHEWSON, a subject of the Queen of Great Britain, residing in Sheffield, in the county of York, England, have invented a certain new and useful Improvement in Apparatus for Separating Dust from Air, of which the following is a true and exact description, reference being had to the accompanying drawings, which form a part thereof.

My invention relates to apparatus especially designed for separating from the air the fine dust resulting in the use of the sand-blast process, although obviously my invention is applicable as well to separating any fine dust from air or other gases.

The nature of my improvements will be best understood as described in connection with the drawings, in which they are illustrated, and in which—

Figure 2:
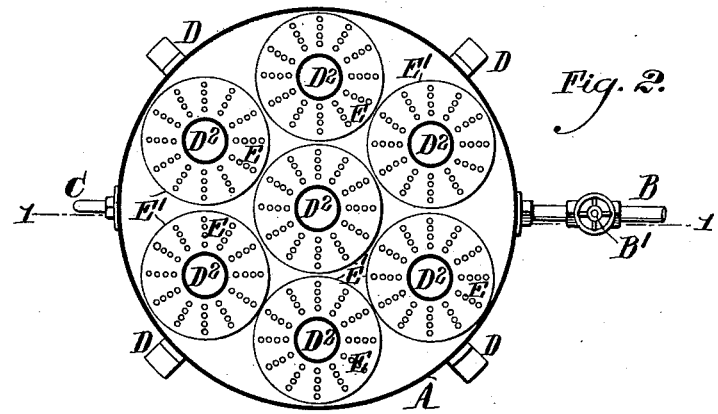
Figure 1:
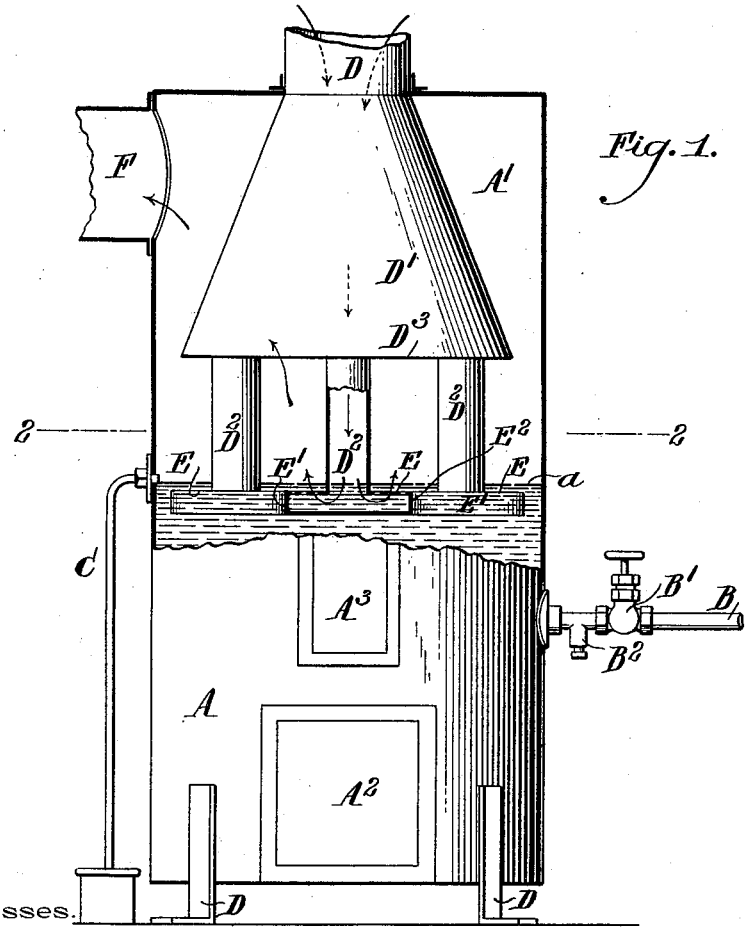

Figure 1 is an elevation of the apparatus, the upper part shown in section on the line 1 1 of Fig. 2; and Fig. 2, a plan view taken on the section-line 2 2 of Fig. 1.

A is a tank adapted to hold water, the upper or air space of the tank being indicated by the symbol A'.

$A^2$ is an opening at the bottom of the tank closed in use by a door or gate, through which the accumulated mud can be removed from time to time, and $A^3$ is a sight-hole or window through which can be observed the accumulation of mud in the tank.

B is a feed-pipe by which water is run into the tank A, B' being a stop-cock and $B^2$ an exhaust-cock, by which the water above its level in the tank can be drawn off at will.

C is the waste-pipe, which determines the normal water-level of the tank, (indicated at $a$.)

D is a pipe or flue by which the air and dust are delivered to the tank. As shown, it extends into the conical form indicated at D' after entering the tank, the bottom of this connection being closed by a head $D^3$ and a series of flues $D^2$, extending from and through the head $D^3$, opening about half an inch or thereabout below the water-level of the tank. Around the bottom of each flue $D^2$ is a perforated plate E, filled with numerous fine holes and formed or provided with a downwardly-extending rim E'.

F indicates the air-escape from the upper part of the tank A.

Of course the number of flues $D^2$ extending below the water-level in the tank may be varied at will. A single one may be used or even more than the seven shown, the size and proportion of the flue or flues and of the plates E being of course varied to conform to the conditions of the use.

It will readily be seen that by the construction indicated all of the dust-laden air is forced through the perforations in the plates E, the escape of the air around the sides of the plate or plates E being prevented by the downwardly-extending flanges.

In all cases where a single dust-flue and plate or sieve are used care should be taken to leave a portion of the area of the tank unoccupied by the perforated plates, for the reason that in this way spaces are provided by which the water forced up through the perforations in the plates E can pass downward into the tank below the plates. In this way a circulation of the water in the tank is effected and the accumulation of an undue amount of water above the plates E avoided, and it is to secure a more efficient circulation that I prefer to use a series of dust-pipes, such as $D^2$, each provided with independent flange-plates E, instead of a single dust-pipe and flange-plate of corresponding size.

Having now described my invention, what I claim as new, and desire to secure by Letters Patent, is—

1. In an apparatus for separating dust from air the combination with a water-tank A of a dust-flue as $D^2$ extending below the water-level in said tank, a perforated plate E surrounding the mouth of the flue $D^2$ and lying below the water-level but not occupying the entire cross-sectional area of the tank and a downwardly-extending rim E' surrounding said plate but not extending to the bottom of the tank.

2. In an apparatus for separating dust from air the combination with a water-tank A of a dust-flue D, a series of flues $D^2$ extending from flue D below the water-level of tank A, a series of perforated plates E, one surrounding the mouth of each flue $D^2$ and lying below the water-level, said plates being of such dimensions that they will not occupy the entire sectional area of the tank and prevent circulation of water therein, and a downwardly-extending rim as E' secured to the edge of each plate but not extending to the bottom of the tank.

JEREMIAH E. MATHEWSON.

Witnesses:
GEO. MOUNT,
MAURICE RAW.